United States Patent [19]

Yamaguchi et al.

[11] Patent Number: 4,919,620

[45] Date of Patent: Apr. 24, 1990

[54] CONNECTOR DEVICE FOR A STEERING SYSTEM

[75] Inventors: Kiichi Yamaguchi; Takehiko Itoh, both of Toda, Japan

[73] Assignee: Alps Electric Co., Ltd., Tokyo, Japan

[21] Appl. No.: 332,633

[22] Filed: Mar. 31, 1989

[30] Foreign Application Priority Data

Jun. 20, 1988 [JP] Japan .............................. 63-80572[U]

[51] Int. Cl.⁵ .............................................. H01R 35/04
[52] U.S. Cl. ...................................................... 439/15
[58] Field of Search ...................... 439/15, 22, 27, 162, 439/164

[56] References Cited

U.S. PATENT DOCUMENTS

| | | | |
|---|---|---|---|
| 3,657,491 | 4/1972 | Ryder et al. | 191/12.2 |
| 4,157,854 | 6/1979 | Beauch . | |
| 4,417,775 | 11/1983 | Sakurai et al. | 439/15 |
| 4,422,699 | 12/1987 | Sakurai et al. . | |
| 4,714,430 | 12/1987 | Zeller | 439/15 |
| 4,797,109 | 1/1989 | Wende | 439/15 |

Primary Examiner—Gary F. Paumen
Attorney, Agent, or Firm—Guy W. Shoup; Paul J. Winters

[57] ABSTRACT

A connector device for a steering system of an automobile is provided, in which a movable member is securely locked to its predetermined initial position when the device is mounted or remounted to a steering system so that it can effectively eliminate any errors in the mounting or remounting operation and the locked condition of the movable member is automatically released when the device is properly set in position. Moreover, since the locking mechanism is accommodated in the inner room (compartment) of the device where axially a relatively large space is available, the device has a variety of advantages including a relatively reduced thickness.

4 Claims, 2 Drawing Sheets

CONNECTOR DEVICE FOR A STEERING SYSTEM

BACKGROUND OF THE INVENTION

1. Field of the Invention

This invention relates to a connector device to be conveniently used with a steering system of an automobile and more particularly to a connector device comprising a combination of two different electric connecting means of a slip ring and a cable assembly.

2. Prior Art

An automobile steering system typically comprises a warning horn switch attached to the steering wheel of the system and, in recent years, there has been a tendency that a switch of an air bag system, a switch of an audio equipment control system and other switches are additionally attached thereto. For this sort of attachment, since the steering wheel is, although in a limited sense of the word, a rotatable member of an automobile, it is necessary to provide a rotatable connector means between the switches carried by the steering wheel and an appropriate fixed member of the automobile to ensure electric connection therebetween.

There have been known two types of connector devices; one called a slip ring which utilizes relative rotation of a ring-shaped conductor body and a scraping member which is frictionally contacted with the conductor body, and the other called a cable assembly which utilizes a cable wound into a plurality of turns between a movable member and a fixed member. The former has the advantage of small dimensions (particularly in the axial direction) but is less capable of maintaining the stability of electric connection for a long time, while the latter is more reliable in terms of electric connection but becomes (axially) voluminous as the number of connection channels increase. Therefore, these two alternatives have their respective merits and demerits.

In order to overcome the above mentioned disadvantages, there has been proposed a connector device comprising two rooms (compartments) which are provided between the movable case and the fixed case of the device and appropriately separated from each other to respectively accommodate a slip ring and a cable assembly. In this device, the circuits which require highly reliable electric connection such as those of an air bag system are electrically connected by way of a cable in the cable assembly and the circuits which are not significantly affected by noises and chatterings such as those of a horn system are electrically connected by way of a slip ring in order to enhance the overall reliability of the connector device and confine its axial dimension, the width of the cable assembly can be reduced by the amount which is replaced by the circuits of the slip ring.

Problems to Be Solved by the Invention

With an above described connector device comprising a slip ring and a cable assembly accommodated in a combination of a movable case and a fixed case, a problem arises because, while the slip ring is infinitely rotatable, the cable assembly is rotatable only to a limited extent. Therefore, the connector system requires a locking mechanism that locks the movable case in such a manner that it can rotate clockwise and counterclockwise to the same extent prior to the mounting operation of the assembled connector device on the steering system. Further, the connector system is released from its locked condition after completion of the mounting operation so that it can freely move thereafter.

A locking mechanism as described above has been known, in which a locking clip member is provided in the movable case. The locking clip member is snap-coupled with an anchoring member formed in the fixed case so that said clip member can be removed from the movable case after completion of the mounting operation of the device on the steering system. Because this locking mechanism is designed for use with a connector device that comprises only a cable assembly and not a slip ring, it has a disadvantage of disabling rotation of the movable case if the clip member is left in it by mistake after use as the clip member is normally made of a hard material such as plastics. If the movable case is forced to rotate with the clip member in it, a portion of the fixed case that holds the anchoring member can be damaged and debris from the broken member can generate strange sounds while the automobile is in motion. A locking mechanism of this type is also accompanied by a drawback of requiring cumbersome operations since the clipping member needs to be placed and removed each time when the connector device is taken out from and returned to its proper position for examination and servicing purposes, for example.

It is therefore an object of the present invention to provide a connector device with a reduced thickness which can automatically release the locked condition of the movable case when it is mounted on the steering system.

SUMMARY OF THE INVENTION

The above object and other objects of the invention are achieved by providing a connector device comprising an inner room (compartment) and an outer room (compartment) formed between a movable member and a fixed member which are rotatably connected to each other, the inner room accommodates a conductor plate and a scraper that is frictionally connected with the conductor plate whereas the outer room accommodates a cable wound in a plurality of turns, the conductor plate and the scraper being moved relative to each other as the movable member is rotated and at the same time the cable is being wound or unwound according to the direction of rotation of the movable member, wherein the device further comprises a partition wall provided on the fixed member projecting into the inner room for rigidly fixing either the conductor plate or the scraper to the upper surface of said partition wall, an anchoring member located along the inner periphery of the partition wall, a stopper member provided on the movable member and resiliently biased against the anchoring member to prevent movement between the fixed and movable members, and an unlocking member being provided on the stopper member for releasing the stopper member from the anchoring member as external equipment presses against the unlocking member.

With a connector device as described above, the movable member is designed so that it is located at a predetermined initial position relative to the fixed member. When it is combined with the latter, it is restricted for its rotational movement since the stopper member is engaged with the anchoring member. This engagement eliminates situations where the movable member is unintentionally rotated during transportation after assembling and/or mounting operations so that the movable member is strictly maintained at its initial position. On the other hand, when the connector device is mounted on the steering system, the stopper member is moved in the direction away from the anchoring member against its resilient force by the steering shaft or some other component of the steering system so that the movable member is automatically released from its locked condition and smoothly moved relative to the fixed member. On the other hand, when the connector device is removed for servicing and/or some other reasons, said stopped member comes into engagement with said anchoring member so that the movable member remains in its locked position and will not show any displacement when it is mounted back to the steering system.

The locking mechanism as described above is provided in such a manner that it is axially juxtaposed with the inner room that accommodates a conductor plate and a scraper. It should be noted that said inner room is far more spacious in the axial direction than the outer room for accommodating a cable and therefore the locking mechanism does not have the effect of increasing the height of the overall device.

BRIEF DESCRIPTION OF THE DRAWINGS

Now the invention will be described is greater detail by referring to the accompanying drawings which illustrate a preferred embodiment of the invention. Of the drawings.

DETAILED DESCRIPTION OF THE INVENTION

Figure 1:
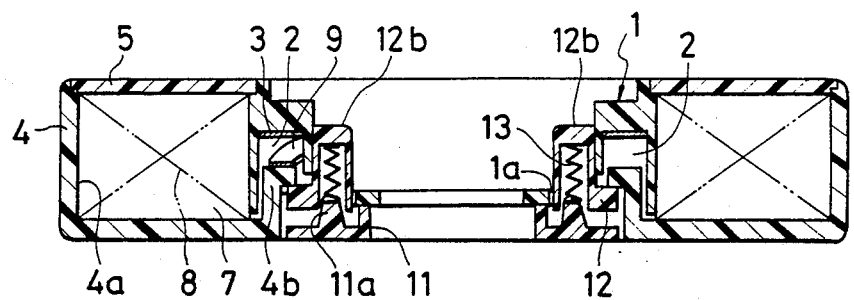
FIG. 1 is a sectional view of an embodiment of the connector device according to the invention.

Referring to FIG. 1 which shows a sectional view of a connector device according to the invention, reference numeral 1 denotes a movable member which comprises an inner room (compartment) 2 having an opening at the bottom of the member 1 and a ring-shaped conductor plate 3 rigidly fitted to the upper wall of the inner room 2.

Reference numeral 4 denotes a cylindrical outer sleeve member 4 having an open upper end and reference numeral 5 denotes a cover designed to close the open upper end of the sleeve member 4, said sleeve member 4 and cover 5 constituting a fixed member 6. Said movable member 1 is rotatably supported at the center of said fixed member 6 and an outer room (compartment) 7 is formed between the outer periphery of the movable member 1 and the outer circular wall 4a of the fixed member 6 to accommodate a flat cable 8 wound to a plurality of turns. Said flat cable 8 is formed by laminating a number of conductive bodies and flexible films made of PET or a similar insulating material and has its both ends exposed and rigidly fitted to said movable member 1 and fixed member 6 respectively.

Figure 2:
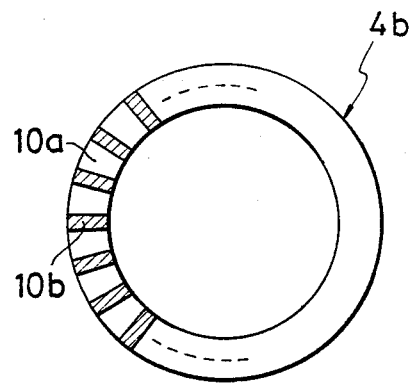
FIG. 2 is a schematic view illustrating the anchoring member.

A ring-shaped partition wall 4b which is formed integrally with said outer sleeve member 4 is projecting at the center thereof and said wall 4b carries a scraper 9 securely fitted thereto at the top thereof as shown in FIG. 1, said scraper 9 being resiliently contacted with the conductor plate 3 rigidly fitted to the movable member 9. Said partition wall 4b carries at its lower end an anchoring member 10 comprising convex portions 10a and concave portions 10b as shown in FIG. 2 (of which the convex portions 10a are hatched) which are alternatively arranged along the periphery of the member 10.

Figure 3:
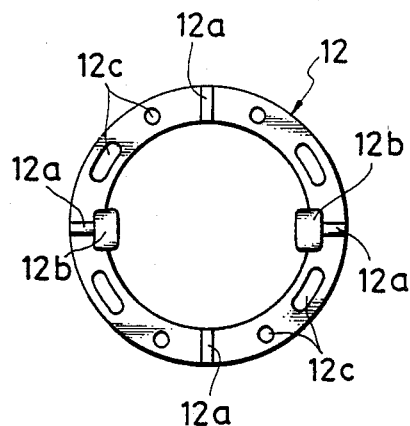
FIG. 3 is a plan view of the stopper member.

A supporting plate 11 comprising a spring receiving portion 11a is provided near the lower end of said movable member, said supporting plate 11 being rigidly fitted to said movable member 1 by means of a plurality of connector pins which are not shown in the drawings. Between said movable member 1 and supporting plate 11 is provided a stopper member 12 in such a manner that it can be moved axially and is biased upwardly in FIG. 1 by a spring 13. As shown in FIG. 3, a plurality of anchoring projections 12a (four in the case of the illustrated embodiment) and a pair of unlocking projections 12b are provided on the upper surface of said stopper 12, of which said unlocking projections 12b project upward running through the respective throughbores 1a provided at the bottom of the movable member 1. Each of the anchoring projections 12a is directly opposed to a corresponding concave portion 10b of the anchoring member 10 formed on the outer sleeve member 4 in such a manner that, when the stopper member 12 is pushed up to the upper position indicated in FIG. 1 by the resilient force of the spring 13, each of the anchoring projections 12a comes to engagement with a corresponding concave member 11b. Consequently, under this condition, an attempt to rotate the movable member 1 relative to the fixed member 6 will be blocked as the anchoring projections 12a come to abut the corresponding convex members 10a of the anchoring member 10. It should be noted that a plurality of bores 12c are provided along the periphery of the stopper member 12 and the connector pins (not shown in the drawings) of the supporting plate 11 are securely fitted to the movable member 1 through their corresponding bores 12c.

A connector device according to the invention and configured as described above functions in the following manner.

To begin with, the components and parts of the device are assembled properly and eventually the conductor plate 3 and the scraper 9, which constitute a slip ring, are accommodated in the inner room 2, while the flat cable 8, a component of a cable reel, is accommodated in the outer room 7 as shown in FIG. 1. At this stage of assembling, the position of the movable member 1 relative to the fixed member 6 can be appropriately corrected by means of a positioning mechanism which is not shown in the drawings so that the flat cable 8 can be rotated clockwise and counterclockwise to an identical extent. It will be apparent from FIG. 4 that, since the anchoring projections 12a of the stopper member 12 are located within the concave portions 10b of the anchoring member 10 under the resilient force of the spring 13, the rotation of the movable member 1 is blocked when the anchoring projections 12a abut the convex portions 10a so that the above mentioned alignment is maintained.

Figure 5:
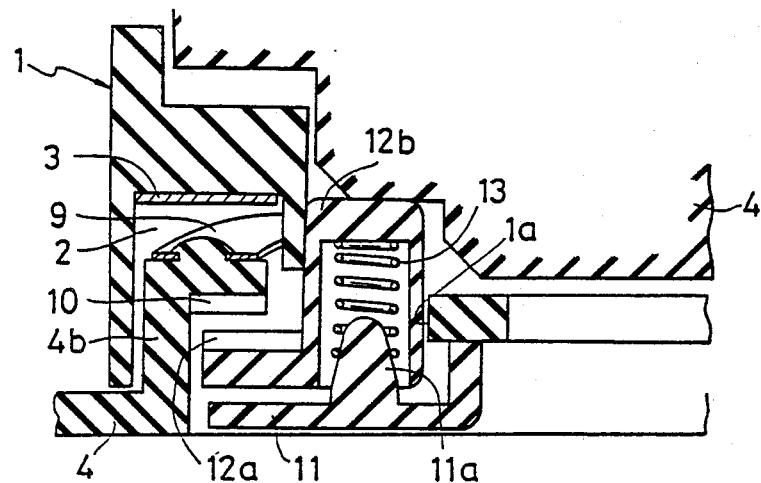
FIG. 5 is a view similar to FIG. 4 but illustrating a condition where the movable member is unlocked.

The assembled connector device is ready to use when the movable member 1 is fitted to a movable member of the steering system (or the steering wheel) and the fixed member 6 is fitted to a fixed member of an automobile. At this stage, the steering hub 14 attached to the steering wheel is inserted into the central bore of the movable member 1 to push down the unlocking projections 12b. Then as shown in FIG. 5, a predetermined clearance is formed between the anchoring projections 12a of the stopper member 12 and the concave portions 10b of the anchoring member 10 so that, once the device is mounted on the steering system, the movable member 1 is automatically released from its locked condition and becomes freely movable.

As for the function of the cable assembly, it should be noted that, when the steering wheel is turned to either direction, the flat cable 8 is wound around the periphery of the movable member 1 and, when the steering wheel is turned to the other direction, the flat cable 8 comes to be wound around the outer wall 4a of the fixed member 6, and the electric connection between the movable member and the fixed member 6 is maintained in either case. On the other hand, as for the function of the slip ring, it should be noted that, while the steering wheel is turned clockwise or counterclockwise, the scraper 9 which is rigidly fitted to the projection 4b of the fixed member 9 moves rubbing the lower surface of the conductor plate 3 which is securely fitted to the movable member 1 so that the electric connection between the movable member 1 and the fixed member 6 is maintained by means of the conductor plate 3 and the scraper 9. It is recommendable to use a cable assembly for electric connection of an air bag system and other circuits which are extremely sensitive to noises, whereas a slip ring can be advantageously used for a horn system and those circuits which are less sensitive to noises.

Figure 4:
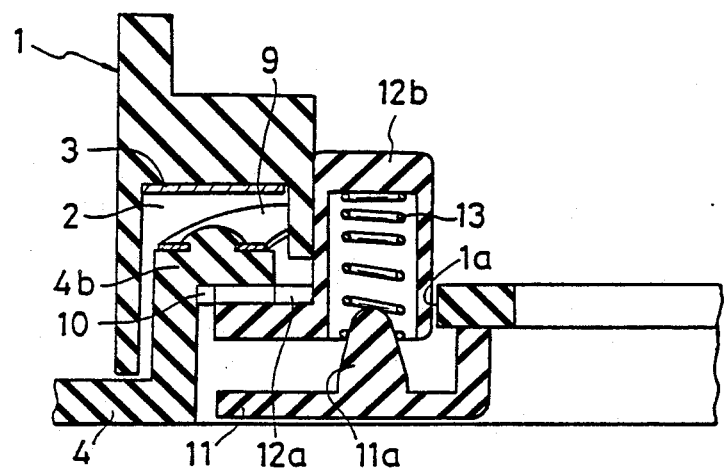
FIG. 4 is a sectional view illustrating a principal area of the movable member in a locked condition.

Cases may arise when the connector device according to the invention is to be removed from the steering system after the former has been attached to the latter for maintenance and other purposes. In such a case, if the movable member 1 is placed in its neutral position and the connector device is pulled out from the steering hub 14, the stopper member 12 moves from the condition as shown in FIG. 5 to the condition as shown in FIG. 4 so that the movable member 1 is locked by the stopper member 12 and the anchoring member 10 against any rotational movement and no displacement of the movable member during a mounting operation occurs.

While in the above description, the conductor plate 3 which is a component of the slip ring is fitted to the movable member 1 and the scraper 9 is fitted to the projections 4b of the fixed member 4b, they can be fitted in the other way.

Effects of the Invention

As described above, the movable member of a connector device according to the invention is securely locked to its predetermined initial position when the device is mounted or remounted to a steering system, it can effectively eliminate any errors in the mounting or remounting operation and the locked condition of the movable member is automatically released once the device is properly set in position. Moreover, since the locking mechanism is accommodated in the inner room of the device where axially a relatively large space is available, the device can be realized with a variety of advantages including a relatively reduced thickness.

What is claimed is:

1. A connector device for a steering system comprising an inner compartment and an outer compartment formed between a movable member and a fixed member which are rotatably connected to each other, said inner compartment accommodating a conductor plate and a scraper electrically engaged with said conductor plate, whereas said outer compartment accommodates a cable wound in a plurality of turns, said conductor plate and said scraper being moved relative to each other as the movable member is rotated and at the same time said cable is being wound or unwound according to the direction of rotation of said movable member, wherein said device further comprises a partition wall provided on said fixed member projecting into said inner compartment for rigidly fixing either said conductor plate or said scraper to an upper surface of said partition wall, an anchoring member located along the inner periphery of said partition wall, a stopper member provided on said movable member and resiliently biased against said anchoring member to prevent movement between said fixed and movable members, and an unlocking member being provided on said stopper member for releasing said stopper member from said anchoring member as external equipment presses against said unlocking member.

2. A connector device for a steering system according to claim 1, wherein said unlocking member comprises a portion of said stopper member provided on the inner periphery of said movable member, said stopper member being so designed that it becomes engaged with said anchoring member provided on said lower surface of said projecting wall of said fixed member under the resilient force of a spring member accommodated under said unlocking member, and said stopper member becoming released from the engagement with said anchoring member of said fixed member as said spring member is compressed.

3. A connector device for a steering system according to claim 1, wherein said external equipment that compresses said spring member from outside is a steering hub.

4. A connector device for a steering system according to claim 1, wherein a supporting member is provided under said stopper member for supporting the spring member.

* * * * *